No. 850,728. PATENTED APR. 16, 1907.
E. D. BRANCH.
VEHICLE AXLE.
APPLICATION FILED SEPT. 8, 1906.
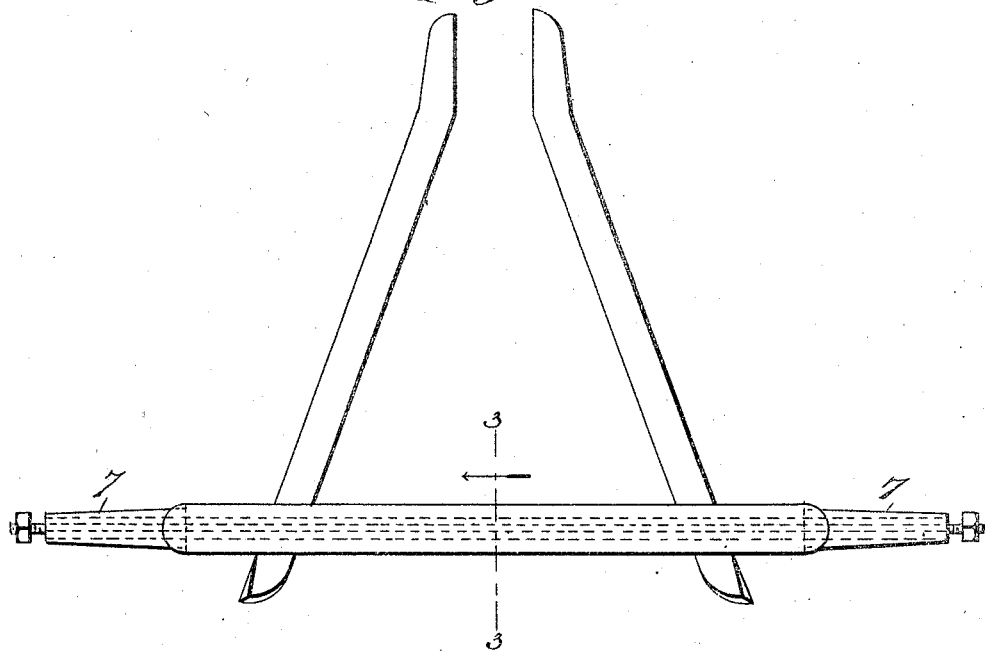
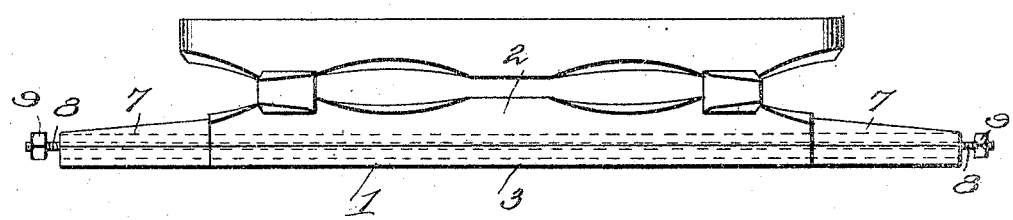
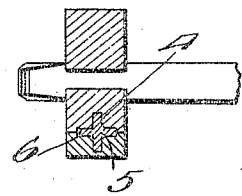
Inventor
E. D. Branch
Witnesses
By Victor J. Evans
Attorney

UNITED STATES PATENT OFFICE.

ELZA D. BRANCH, OF CHARDON, OHIO.

VEHICLE-AXLE.

No. 850,728.　　　Specification of Letters Patent.　　　Patented April 16, 1907.

Application filed September 8, 1906. Serial No. 333,830.

*To all whom it may concern:*

Be it known that I, ELZA D. BRANCH, a citizen of the United States, residing at Chardon, in the county of Geauga and State of Ohio, have invented new and useful Improvements in Vehicle-Axles, of which the following is a specification.

My invention relates to improvements in vehicle-axles, its object being to provide an axle which is light in weight, simple, strong, and durable in construction, which combines in a composite structure the desirable qualities of wood and metal, and which may be manufactured at a comparatively low cost.

In the accompanying drawings, Figure 1 is a top plan view of a portion of the frame of a vehicle running-gear equipped with my improved axle. Fig. 2 is a front elevation of the same. Fig. 3 is a section on line 3 3 of Fig. 1.

Referring to the drawings, 1 designates the axle, which in accordance with my invention is composed of two or more sections of wood connected and reinforced by a central longitudinal metallic core. As shown in the present instance, the axle is composed of top and bottom sections 2 and 3, the meeting faces of which are adapted to closely contact and are formed with grooves or recesses 4 for the reception of a metallic core 5, which is provided with a plurality of longitudinal flanges 6 equal in number to and fitting within said grooves to hold the parts 2 and 3 securely connected and to strengthen them to resist the strains to which an axle is ordinarily subjected. The core disclosed in the present instance is of cruciform shape, its flanges being so arranged as to reinforce the wooden hub-sections against both transverse and vertical strain. In addition to the core which closely fits within and interlocks with the grooves any suitable means may be employed for securely fastening or uniting the parts.

The ends of the body of the axle proper are suitably reduced to provide spindle-sections 7, which are tapered in the usual manner, and the ends of the core extend through said spindle-sections and are provided with projecting screw-stems 8, adapted to receive nuts 9, which hold the skeins of the axles in position. These spindle-sections are in proper form to receive skeins of the usual form and construction.

It will thus be seen that the invention provides an axle which is light in weight, owing to the fact that the body-sections are made of wood, and which is also of great strength, owing to the peculiar form and arrangement of the metallic cores. The axle is furthermore of simple construction and may be manufactured at a comparatively low cost.

Having thus described the invention, what is claimed as new is—

1. An axle comprising opposing body-sections, the meeting faces of said sections being formed with grooves, and a metallic core of cruciform shape having its flanges projecting into said grooves.

2. An axle comprising top and bottom wooden sections, the meeting faces of said sections being formed with grooves, and a metallic core of cruciform shape having its flanges projecting into said grooves.

In testimony whereof I affix my signature in presence of two witnesses.

ELZA D. BRANCH.

Witnesses:
W. H. OSBORNE,
A. R. JONES.